United States Patent [19]

Huang et al.

[11] Patent Number: 5,801,678

[45] Date of Patent: Sep. 1, 1998

[54] FAST BI-LINEAR INTERPOLATION PIPELINE

[75] Inventors: Wei-Lun Huang, Taichung; Kimbo Hsiao, Taipei; Hung-Yih Hsieh, Hsinchu, all of Taiwan

[73] Assignee: Industrial Technology Research Institute, Hsin chu, Taiwan

[21] Appl. No.: 638,258

[22] Filed: Apr. 26, 1996

[51] Int. Cl.$^6$ ............................................. G09G 5/00
[52] U.S. Cl. .................... 345/127; 395/13.9; 382/298; 348/581; 365/132
[58] Field of Search ................................. 345/127, 128, 345/129, 130, 131, 132; 348/580, 581; 393/139, 172, 506; 382/232, 254, 276, 298, 299, 300, 301

[56] References Cited

U.S. PATENT DOCUMENTS

| | | | |
|---|---|---|---|
| 4,402,012 | 8/1983 | Knight | 348/580 |
| 4,988,984 | 1/1991 | Gonzalez-Lopez | 345/132 |
| 4,990,902 | 2/1991 | Zenda | 345/132 |
| 5,054,100 | 10/1991 | Tai | 345/137 |
| 5,301,265 | 4/1994 | Itoh | 395/139 |

*Primary Examiner*—Dennis-Doon Chow
*Attorney, Agent, or Firm*—W. Wayne Liauh

[57] ABSTRACT

A high-speed real-time bi-linear interpolation apparatus is disclosed for scaling an old M×M' image into a new N×N' image by which the pixel value of a new pixel q(x', y') is interpolated from the pixel values of four immediately enclosing old pixels, p(x, y), p(x+1, y), p(x, y+1), and p(x+1, y+1). The fast bi-linear interpolation apparatus comprises: (a) a counter for obtaining the x-directional and y-directional pixel counts of the new pixel (x', y'), designated as n and n', respectively; (b) an accumulator for calculating the x-directional and y-directional pixel counts of the he old pixel (x, y), designated as m and m', respectively; (c) logic circuits associated with the accumulator means for calculating x-directional and y-directional interpolation parameters Acc and Acc', respectively, wherein Acc is the numerator of fraction after the division of (n·M+N), and Acc' is the numerator of fraction after the division (n'·M'+N'); (d) first quantizer for quantizing Acc/N into $K_y/2^i$, wherein i is an integer greater than 1; (e) second quantizer for quantizing Acc'/N' into $K_x/2^i$; (f) first, second, and third interpolation pipelines, wherein the first and second interpolation pipelines are connected in parallel for obtaining first and second interpolated values from p(x, y) and p(x+1, y), and from p(x, y+1) and p(x, y), respectively, and the third interpolation pipeline is provided to obtain q(x', y') from the first and second interpolated values; and (g) a delay circuit for delaying the execution of the third interpolation pipeline until the executions of the first and second interpolation pipelines are completed. Since only very simple components, such as adders, hard-wired fixed-value multipliers and multiplexers, are used to perform the bi-linear interpolation, extremely fast speed is achieved on a real time basis.

12 Claims, 12 Drawing Sheets

FAST BI-LINEAR INTERPOLATION PIPELINE

FIELD OF THE INVENTION

The present invention relates to an apparatus and method for effectuating fast bi-linear interpolation of pixel data during the scaling of video images. More specifically, the present invention relates to an apparatus and method to be used in conjunction with a video display system for fast and real time bi-linear interpolation of digital pixel data, mainly the pixel intensity, during the enlargement/reduction of video images which ensure the preservation of smooth video images and eliminate many of the limitations that exist in the prior art methods/apparatus.

BACKGROUND OF THE INVENTION

Image scalability is becoming an important part of today's image display systems. In order to reduce storage space, images are typically stored with reduced resolutions, i.e., containing a reduced number of pixels. When these images are displayed on a video screen of enhanced resolution, they also become too small a size to be viewed with the desired comfort. Therefore, it is important to develop appropriate interpolation techniques which would allow enlargement/reduction to be made on the fly, without sacrificing image quality. Image reduction is also an important technique to allow efficient image storage and transfer. The need for improved interpolation techniques becomes more imperative with the rapid developments of image processing devices such as MPEG decoders, video accelerators (many of them are commonly called Windows® accelerators), scanners, etc.

The implementation of image reduction/enlargement has been typically accomplished in the prior art through the use of pixel elimination (for image reduction) or pixel duplication (for image magnification). Using pixel duplication for image magnification has the effect of causing considerable jaggedness (or blockiness) in the outline of the image, because this form of magnification has the effect of creating what amounts to using a large chunk of pixels, all with the same intensity, in place of each original pixel. The method of pixel replication is particularly undesirable in an image display system which allows for the display of multiple shades of gray or colors. The replication of individual pixels often creates a grainy picture of low quality.

In U.S. Pat. No. 4,402,012, the content thereof is incorporated by reference, it is disclosed a two-dimensional interpolation system of image data for a video display system which comprises: (a) a one-dimensional linear interpolation means for providing interpolated data values between pairs of input data values to generate primary interpolated scan lines for a video image, and (b) means for providing selected output data values of the primary interpolated scan lines as input data to the one-dimensional linear interpolator means for interpolation in a dimension perpendicular to the primary interpolated scan lines to generate intermediate interpolated scan lines. The interpolation system disclosed in the '012 patent does not provide a real time operation; it requires storing the output images from the horizontal interpolations before the vertical interpolation can be performed. This can substantially slow down the operation. As a result its application is limited to only four-to-one interpolations.

In U.S. Pat. No. 4,988,984, the content thereof is incorporated by reference, it is disclosed an image interpolator which implements an interpolation function providing real time, continuous zoom capability to an image display system. The bi-linear image interpolator disclosed in the '984 patent involves, among other things, (a) means for storing the images to be interpolated; (b) means for transferring the images to be interpolated into a plurality of line buffers; (c) coefficient incrementing means for generating interpolation coefficients for interpolation; (d) coefficient correction means for accumulating an error term and for correcting the generated coefficient; and (e) filter means for generating interpolated image values. With the '984 invention, while the interpolation coefficients can be generated on a real time basis, because of the relatively complicated circuitry involved, this system may not provide a speed that is fast enough to satisfy the need of today's high level display devices.

In U.S. Pat. No. 5,054,100, the content thereof is incorporated by reference, it is disclosed methods and apparatus for interpolating existing gray-level pixel data to obtain new pixel values during image reduction and enlargement. The '100 invention primarily involves a non-linear, "quadratic", interpolation equation, which is used to apply location weighting factors to the intensity values of neighboring pixels, and edge strength modifying factors are used to modify the weighting factors in the x, y, and diagonal directions. Because of the relatively complicated interpolation steps, the '100 invention is not implemented on a real time basis, and is primarily used for reducing and enlarging images for electronic photocopiers, which are typically many orders of magnitude slower than video display devices.

In U.S. Pat. No. 5,237,432, the content thereof is incorporated by reference, it is disclosed an image processing system for altering the size of an image represented by a plurality of input video signals. Basically, two successive input pixel values $P_n$ and $P_{n+1}$ are first obtained. At the same general time, an arithmetic accumulation of the sum of a seed value, a previously accumulated, and a supplemental value is calculated. The accumulated sum has both integer and fractional portions, the integer portion of the accumulated sum is used to determine whether the first and second input pixel values are to be used to produce an output pixel value. Because certain pixels are eliminated during the interpolation process, blocky pictures may result. A plurality of filters are required to eliminate this blockiness.

In U.S. Pat. No. 5,301,265, the content thereof is incorporated by reference, it is disclosed an apparatus for converting N picture elements (pixels) of an image into an M pixel scaled representation of the same image. The '265 invention involves the steps of duplicating or deleting pixels from the original image so as to form the M pixels of scaled image. Since the '265 invention primarily involves only adder operations, it is extremely fast. However, it does not involve a desired interpolation function, and, as a result, conspicuous blockiness of the images are often encountered. Furthermore, this method has a very limited scaling capability; typically, only reduction/enlargement ratios of n/1024 or 1024/n can be accommodated.

SUMMARY OF THE INVENTION

The primary object of the present invention is to develop an improved method and apparatus for bi-linear interpolation of pixel data during the reduction/enlargement of video images. More specifically, the primary object of the present invention is to develop an improved apparatus and method to be used in conjunction with an image processing device to provide fast and real time bi-linear interpolation of digital pixel data so as to ensure the smoothness of the video image and eliminate the jaggedness experienced in the prior art method, during the enlargement/reduction of video images. The method and apparatus disclosed in the present invention can be used in conjunction with, or incorporated into, many advanced image processing devices such as MPEG decoders, video accelerators, scanners, etc.

One of the key elements of the present invention is that its novel design allows a very fast interpolation pipeline, which involves only simple components, to be used to perform the bi-linear interpolation. Thus extremely fast speed can be achieved on a real time basis. In the system disclosed in the present invention, the old image P is scaled into a new image Q. The pixel value(s) to be assigned to a new pixel $q(x', y')$ is interpolated bi-linearly from its immediately enclosing old pixels, $p(x, y)$, $p(x+1, y)$, $p(x, y+1)$, and $p(x+1, y+1)$ according to the following weighting formula:

Formula 0:

$$q(x', y')=(1-s)\cdot(1-t)\cdot p(x, y)+s\cdot(1-t)\cdot p(x+1, y)+(1-s)\cdot t\cdot p(x, y+1)+s\cdot t\cdot p(x+1, y+1)$$

Where s and t are normalized pixel-dependent x-directional and y-directional weighting coefficients, respectively. Both s and t are distance-adjusted weighting coefficients; $s=|X(x)-X(x')|/|X(x+1)-X(x)|$ and $t=|Y(y)-Y(y')|/|Y(y+1)-Y(y)|$, X and Y denote the x and y coordinates, respectively. This interpolation scheme is well-known in the art, and the key of the present invention is to develop an electronic circuitry to perform this bi-linear interpolation in a very fast manner and on a real time basis.

In carrying out the bi-linear interpolation scheme described above, two alternative embodiments can be used. In the first embodiment, the pixel value $q(x', y')$ is calculated according to the following formula:

Formula 1:

$$q(x', y')=(1-t)\cdot[(1-s)\cdot p(x, y)+s\cdot p(x+1, y)]+t\cdot[(1-s)\cdot p(x, y+1)+s\cdot p(x+1, y+1)]$$

The first embodiment can be considered as performing two first linear interpolations in the x-direction (at y and y+1), respectively, then a second interpolated in performed in the y-direction using the x-interpolated values as inputs.

Formula 2:

$$q(x', y')=(1-s)\cdot[(1-t)\cdot p(x, y)+t\cdot p(x, y+1)]+s\cdot[(1-t)\cdot p(x+1, y)+t\cdot p(x+1, y+1)]$$

The second embodiment can be considered as performing two first linear interpolations in the y-direction (at x and x+1), then a second interpolated in the x-direction is performed based on the y-interpolated values.

In the system disclosed in the present invention, the weighting coefficients s and t are obtained from a multiple-bit (i-bit) quantizer as follows:

x-directional interpolation:

Assuming that the old and new image have M and N columns, respectively, and that the new pixel q $(x', y')$ is at the nth column, the first step is calculate the column location, or pixel count, m, of the old pixel $p(x, y)$ to be used in formula 0, above:

$$m=INT(n\cdot M \div N)$$

then the value of s can be calculated as follows:

$$s=n\cdot M+N-m$$

Thus m is the integer portion of the division (n·M÷N), and s $(0 \leq s \leq 1)$ is the fractional residual. After the value of m is determined, the for enclosing old pixels, $p(x, y)$, $p(x+1, y)$, $p(x, y+1)$, and $p(x+1, y+1)$, from which the value of the new pixel is to be interpolated, can be determined. The value of s provides the weighting factor.

The quantizer utilizes the numerator of s, denoted as Acc, and the value of N, by quantizing the value of (Acc/N) into the closest $K_x/2^i(K_x=0, \ldots, 2^i)$, in which "i" is an integer. The higher the value of "i", the closer the quantized value approximates the actual value. However, a higher "i" will cause the cost of the quantizer to increase. In the present invention, the value of Acc is obtained via an accumulator. The present invention also includes a pair of circuit means to calculate the values of $1 \times p(x, y)$, $2 \times p(x, y)$, ..., and $2^i \times p(x, y)$, and $1 \times p(x+1, y)$, $2 \times p(x+1, y)$, ..., and $2^i \times p(x+1, y)$, respectively. The interpolation scheme disclosed in the present invention involves two multiplexers. The first multiplexer chooses one input from the $2^i$ inputs of $\{0, 1 \times p(x+1, y), 2 \times p(x+1, y), \ldots, (2^i-1) \times p(x+1, y)\}$ according to the value of $K_x$, i.e., if the value of $K_x$ is 3, then the third input value will be chosen. On the other hand, if the value of $K_x$ is 0, then the zeroth input value will be chosen. The second multiplexer, on the contrary, chooses one from the inputs of $\{1 \times p(x, y), 2 \times p(x, y), \ldots, 2^i \times [p(x+1, y) \text{ or } p(x, y)]\}$ according, reversely, to the value of $K_x$, i.e., if the value of $K_x$ is 3 and i=3, then the fifth (i.e., $2^i - K_x$) input value will be chosen. A third multiplexer is provided to determine, based on the most significant bit of $K_x$, whether $p(x+1, y)$ or $p(x, y)$ is to be chosen as one of the inputs to the second multiplexer. If the most significant bit of $K_x$ is one (i.e., $K_x=2^i$), then the third multiplexer will select $p(x+1, y)$; otherwise, $p(x, y)$ will be selected.

The outputs from the first and second multiplexers are added in an adder, then the sum coming out of the added is divided by $2^i$. This produces the interpolated value $q(x', y)$. In a second identical interpolation pipeline, the interpolated value $q(x', y+1)$ is generated. The interpolated values of $q(x', y)$ and $q(x', y+1)$ are then used as inputs in a third identical interpolation pipeline for y-directional interpolation, and the new value $q(x', y')$ is then generated.

y-directional interpolation:

The interpolation pipeline in the y-direction is identical to that in the x-direction, except that the interpolation coefficients are different. In the y-direction, it is assumed that the old and new image have M' and N' rows, respectively, and that the new pixel q $(x', y')$ is at the n'th row. The first step is to calculate the row location of the old pixel $p(x, y)$ (i.e., the linear pixel count of $p(x, y)$ in the y-direction) to be used in formula 0, above:

$$m'=INT(n'\cdot M'+N')$$

then the value of t can be calculated as follows:

$$t=n'\cdot M'+N'-m'$$

Thus m' is the integer portion of the division (n'·M'+N'), and t $(0 \leq t \leq 1)$ is the fractional residual. The quantizer utilizes the numerator of t, denoted as Acc', and the value of N' by quantizing the value of (Acc'/N') into the closest $K_y/2^i(K_y=0, \ldots, 2^i)$.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
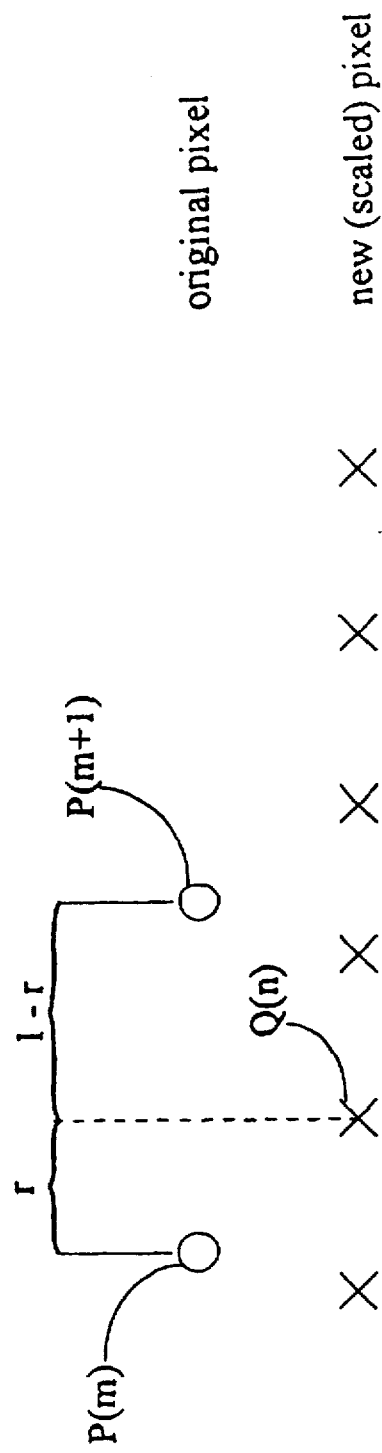
FIG. 1 illustrates a conventional one-dimensional linear interpolation scheme, by which the value of the new pixel Q(n) is to be interpolated from the two old pixels P(m) and P(m+1).

The present invention discloses an improved method and apparatus for use in conjunction with an image processing device to administer bi-linear interpolation of pixel data during the reduction/enlargement of video images so as to ensure the smoothness of the video image and without the jaggedness often experienced in the prior art method. The method and apparatus disclosed in the present invention can be used in conjunction with, or incorporated into, a variety of image processing devices such as MPEG decoders, video accelerators, scanners, etc.

The first step in the method disclosed in the present invention, which scales an old M x M' (M columns by M' rows) image into an new N×N' image, involves locating the four immediately enclosing old pixels, p(x, y), p(x+1, y), p(x, y+1), and p(x+1, y+1), from which the value of a new pixel q(x', y') will be interpolated. The direction of x can be either the horizontal or vertical direction, and y will be the other direction. The apparatus of the present invention comprises the following main components:

(a) counting means for obtaining the x-directional and y-directional pixel counts (i.e., the serial position) of the new pixel (x', y'), designated as n and n', respectively;

(b) accumulator means for calculating the x-directional and y-directional pixel counts of the old pixel (x, y), designated as m and m', respectively;

(c) means associated with the accumulator means for calculating the x-directional and y-directional interpolation parameters Acc and Acc', respectively, wherein Acc is the numerator of the fraction after the division of (n·M+N), and Acc' is the numerator of the fraction after the division (n'·M+N');

(d) first quantizer means for quantizing Acc/N into $K_x/2^i$, wherein i is an integer greater than 1;

(e) second quantizer means for quantizing Acc'/N' into $K_y/2^i$;

(f) first, second, and third interpolation pipelines, the first and second interpolation pipelines are connected in parallel for obtaining first and second interpolated values from p(x, y) and p(x+1, y), and from p(x, y+1) and p(x+1, y+1), respectively, and the third interpolation pipeline is provided to obtain q(x', y') from the first and second interpolated values; and (g) a delay means for delaying the execution of the third interpolation pipeline until the executions of the first and second interpolation pipelines are completed.

In the apparatus disclosed in the present invention, each of the interpolation pipelines comprises the following elements:

(a) input means for receiving first and second values, designated as P1 and P2, respectively, from which interpolation is to be made, P2 being greater than P1 (i.e., latter in position);

(b) first circuit means to calculate the values of 1×P1, 2×P1, ..., and $2^i$×P1;

(c) second circuit means to calculate the values of 1×P2, 2×P2, ..., and $2^i$×P2;

(d) a first multiplexer means for orderly selecting one output from $2^i$ inputs of {0, 1×P2, 2×P2, ..., ($2^i$−1)×P2} according to the value of $K_x$;

(e) a second multiplexer means for reverse-orderly selecting one output from $2^i$ inputs of {1×P1, 2×P1, ..., $2^i$×[P1 or P2]} according to the value of $K_x$;

(f) a third multiplexer for selecting either P1 or P2 is to be chosen as an input to be sent to the second multiplexer, the third multiplexer is adopted to receive the most significant bit of $K_x$, such that if the most significant bit of $K_x$ is one, then the third multiplexer will select P2, otherwise, P1 will be selected;

(g) an adder for adding outputs from said first and second multiplexers; and (h) a divider for dividing the output from the adder in step (g) by $2^i$.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Obtaining Quantized Interpolation Parameter

FIG. 1 illustrates a conventional one-dimensional linear interpolation scheme, by which the value (which can be luminance, chrominance, grey level, etc.) of the new pixel Q(n) is to be interpolated from the two old pixels P(m), which is the immediately preceding enclosing pixel, and P(m+1), which is the immediately succeeding enclosing pixel. In FIG. 1, r is the normalized distance between P(m) and Q(n), and 1−r is the normalized distance between Q(n) and P(m+1), and m and n are the pixel counts (the first pixel has a count of 0, the second pixel has a count of 1, etc.) of P(m) and Q(n), respectively. A linear interpolation is performed based on the following formula:

$$Q(n)=(1-r) * P(m)+r * P(m+1)$$

Assuming an old image having M pixels is to be scaled to a new image having N pixels, the first step in calculating the pixel value to be assigned to the new pixel Q(n) is to determine the count number of m and the normalized distance r:

$$m=INT(n\cdot M+N)$$

$$r=n\cdot M+N-m$$

In the method disclosed in the present invention, a novel quantized interpolation parameter K ($K_x$ or $K_y$) is employed, in place of r, in the calculations. To obtain the quantized interpolation parameter, we first obtain the value of Acc according to the following formula:

$$Acc=r * N$$

Figure 2:
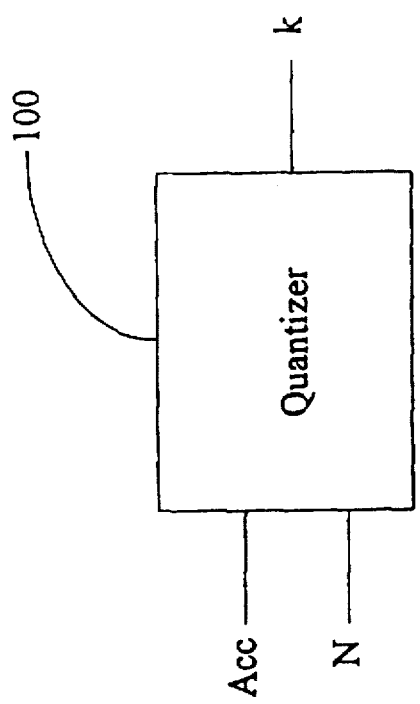
FIG. 2 shows a block diagram for quantizing the value of Acc/N into $K/2^i$, wherein i is an integer greater 1 and K is the calculated quantized interpolation parameter.

FIG. 2 shows a block diagram for quantizing the value of Acc/N into $K/2^i$ using a quantizer 100, wherein i is an integer greater 1 and K is the calculated quantized interpolation parameter. The greater the value of i, the most closely the value of Acc is to be represented by K. If i=3, then the value of K will be from 0 to 8, for a total of 4 bits. Thus the interpolation pipeline requires an extra (i+1) bits, in addition to the bit number reserved for the pixel values.

EXAMPLE 2

One-Dimensional Interpolation Pipeline

Figure 3:
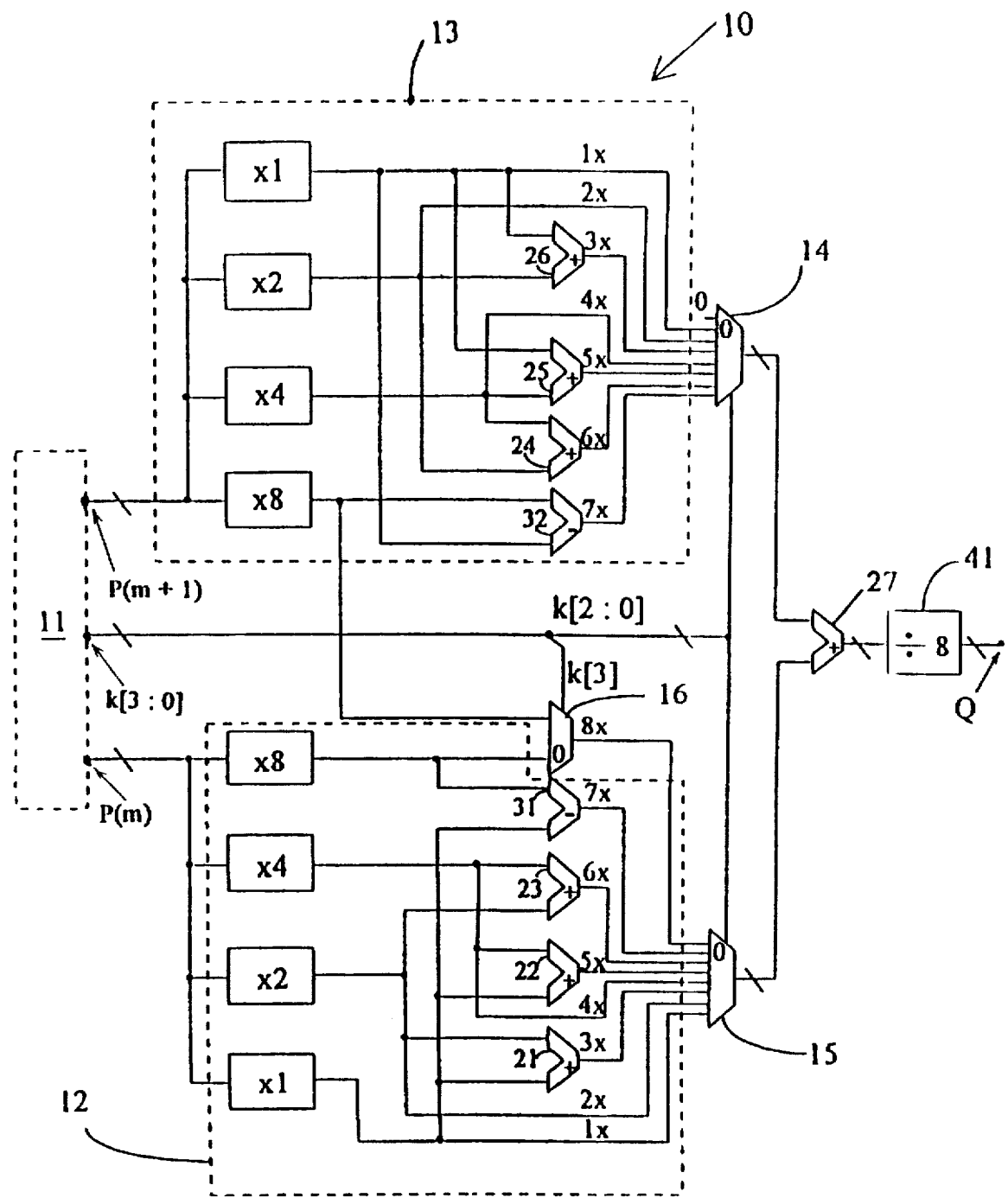
FIG. 3 is a schematic diagram of a one-dimensional interpolator according to a preferred embodiment of the present invention.
Figure 4:
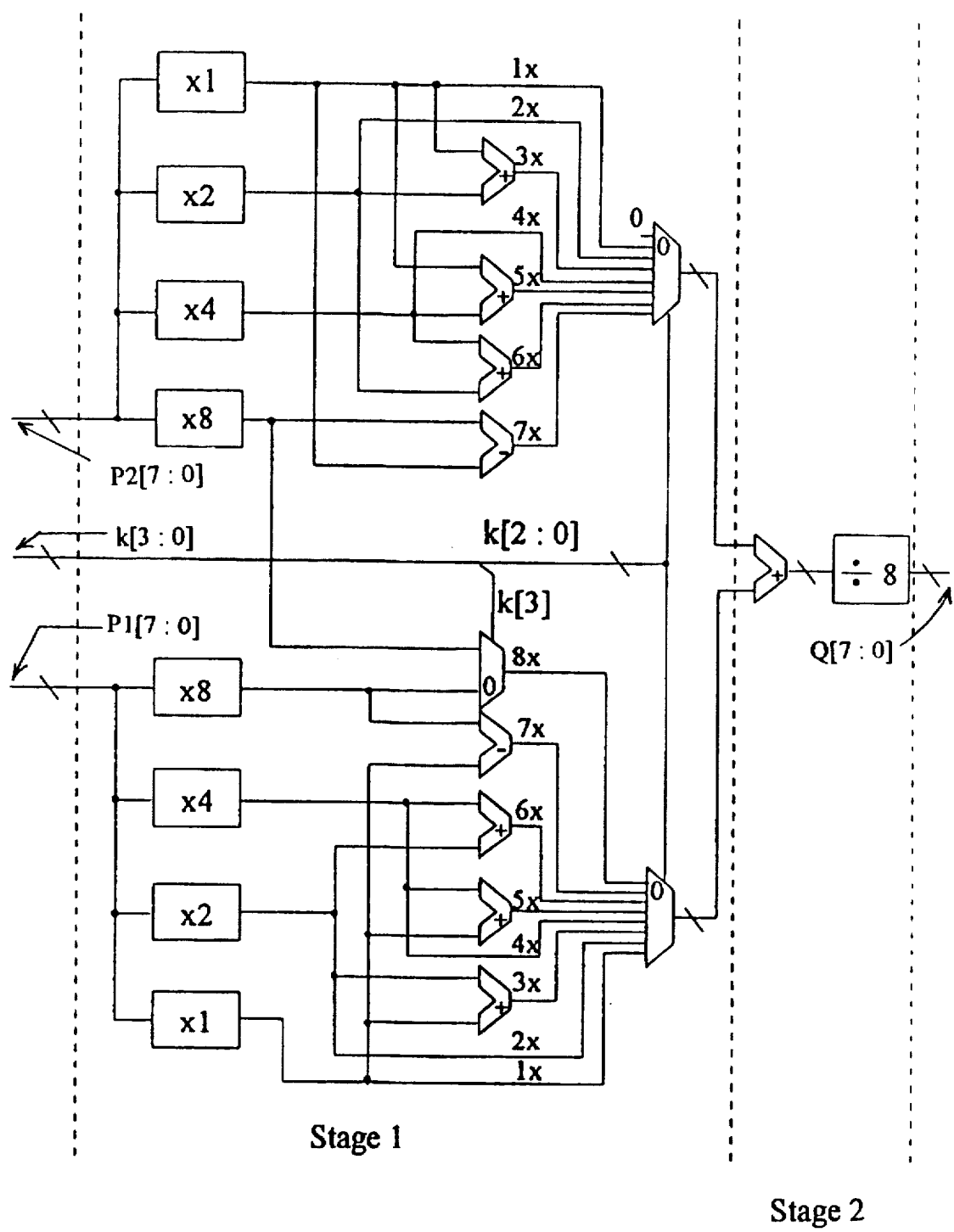
FIG. 4 is a schematic diagram of the same interpolator as shown in FIG. 3 in a pipeline structure.

FIG. 3 shows a schematic diagram of a preferred embodiment of a one-dimensional interpolator according to a preferred embodiment of the present invention, and FIG. 4 shows the same interpolator in a pipeline structure. FIG. 4 assumes that the pixel is 8-bit; however, the present invention can be applied to any types of pixels, as shown in FIG. 3.

Combining FIGS. 3 and 4, the interpolation pipeline 10 can be divided into stage 1 and stage 2. In stage 1, the interpolation pipeline contains the following elements:

(a) input means 11 for receiving P1, or P(m), and P2, or P(m+1), as inputs (b) first circuit means 12 to calculate the values of 1×P1, 2×P1, 3×P1, . . . , and 8×P1, respectively;

(c) second circuit means 13 to calculate the values of 1×P2, 2×P2, 2×P2, . . . , and 8×P2, respectively;

(d) a first multiplexer means 14 for orderly selecting one output from eight inputs of {0, 1×P2, 2×P2, . . . , 7×P2} according to the value of K[2:0] (i.e., K minus the most significant bit);

(e) a second multiplexer means 15 for reverse-orderly selecting one output from the eight inputs of {1×P1, 2×P1, . . . , 8×[P1 or P2]} according to the value of K[2:0]; and (f) a third multiplexer 16 for selecting either P1 or P2 as an input to be sent to the second multiplexer (in step (e)), the third multiplexer is adopted to receive the most significant bit of K (i.e. K[3]), such that if the most significant bit of K is one, then the third multiplexer will select P2, otherwise, P1 will be selected.

Stage 2 of the interpolation pipeline comprises an adder 27, which receives inputs from the first and second multiplexers 14 and 15, and a divider 41. The operation of the interpolation pipeline 10 can be illustrated by the following examples:

(1) When K is 5 (i.e.. [0101]: The first multiplexer will orderly select 5×P2 (the fifth input counting from the lowest value, which is the zero-th input); whereas, the second multiplexer will reverse-orderly select 3×P1 (the fifth input counting from the highest value, which is the zero-th input). After the adder 27 and the divider 41, the interpolated value so obtained is: (5/8)×P2+(3/8)×P1. This calculation approximates the value of r×P2+(1-r)×P1.

(2) When K is 0 (i.e. [0000]: Since K[3] is 0, 8×P1 will be selected by the third multiplexer 16 and the second multiplexer 15, and 0 will be output by the first multiplexer 14. After the adder 27 and the divider 41, the interpolated value so obtained is: (0/8)×P2+(8/8)×P1=P1.

(3) When K is 8 (i.e., [1000]: Since K[3] is 1, 8×P2 will be selected by the third multiplexer 16. Then, because K[2:0]=0, the second multiplexer 15 will select 8×P2 (the zero-th input), and 0 will be output by the first multiplexer 14 (also the zero-th input). After the adder 27 and the divider 41, the interpolated value so obtained is: (8/8)×P2+(0/8)×P1=P2.

FIGS. 3 and 4 also show two sets of four multipliers (x1, x2, x4, and x8) that are provided in the first and second circuit means, respectively, so as to obtain x1 (no shift), x2 (left-shifted by 1 bit), x4 (left-shifted by 2 bits), and x8 (left-shifted by 3 bits). As shown in FIGS. 3 and 4, multiplications by factors of 1 through 6 (1x through 6x) are performed via adders, 21–26,; whereas multiplication by 7 (7x) is achieved via a subtractor 31 or 32. Typically, these multipliers can be left shift registers. In a preferred embodiment of the present invention, because the multiplication factors are fixed, they are hard-wired (e.g., by connecting the input bits to respectively more significant bits) to provide fixed-value multiplication. This greatly simplifies the hardware and increases calculational speed.

EXAMPLE 3

Two-Dimensional Interpolation

Figure 5:
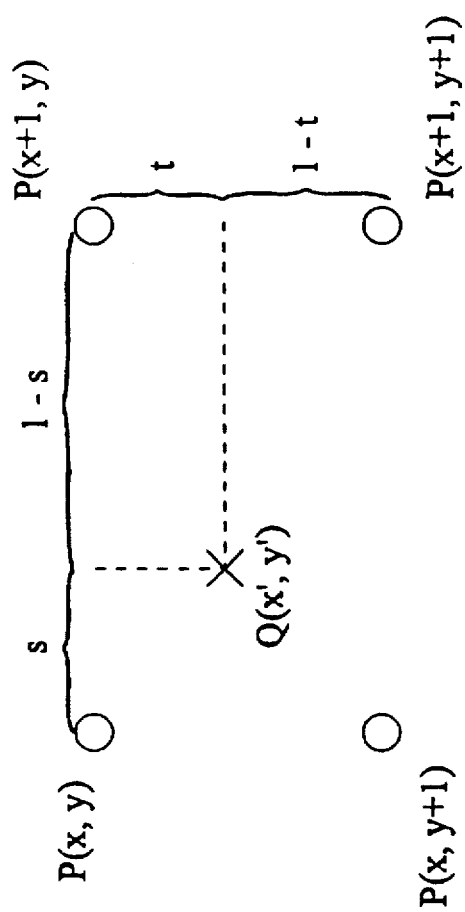
FIG. 5 is a schematic diagram showing a two-dimensional linear interpolation to obtain the pixel value of Q(x', y') from P(x, y), P(x+1, y), P(x, y+1), and P(x+1, y+1) according to the standard bi-linear interpolation scheme.

FIG. 5 is a schematic diagram showing a two-dimensional linear interpolation to obtain the pixel value of Q(x', y') from P(x, y), P(x+1, y), P(x, y+1), and P(x+1, y+1) according to the standard bi-linear interpolation scheme:

$$Q(x', y') (1-s)\cdot(1-t)\cdot P(x, y)+s\cdot(1-t)\cdot P(x+1, y)+(1-s)\cdot t\cdot P(x, y+1)+ s\cdot t\cdot P(x+1, y+1)$$

Where s and t are pixel-dependent x-directional and y-directional weighting coefficients, respectively. Both s and t are distanced-adjusted weighting coefficients; s=|X(x)–X(x')|/ |X(x+1)–X(x)| and t=|Y(y)–Y(y')|/ |Y(y+1)–Y(y)|, X and Y denote the x and y coordinates, respectively.

Figure 6:
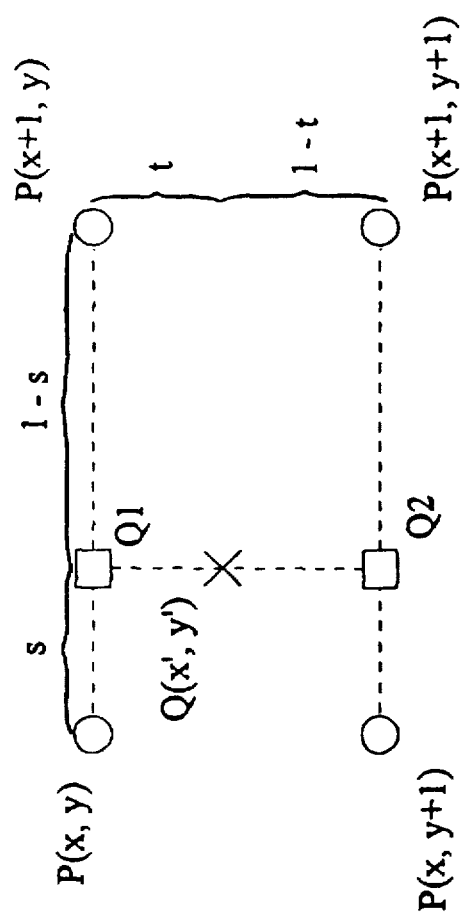
FIG. 6 is a schematic diagram of the first embodiment of bi-linear interpolation, in which the interpolation procedure is first performed in the x-direction, then the y-direction.

As discussed above, in carrying out the bi-linear interpolation scheme, two alternative embodiments can be used. In the first embodiment, the pixel value q(x', y') is calculated according to the following formula:

Embodiment 1: FIG. 6 shows the first embodiment, in which interpolation is performed in the x-direction, then the y-direction.

$$Q1=(1-s)\cdot p(x, y)+s\cdot p(x+1, y)$$

$$Q2=(1-s)\cdot p(x, y+1)+s\cdot p(x+1, y+1)$$

then $$q(x', y')=(1-t)\cdot Q1+t\cdot Q2$$

Embodiment 2: Interpolation is first performed in the y-direction, then the x-direction.

$$Q1'=(1-t)\cdot p(x, y)+t\cdot p(x, y+1)$$

$$Q2'=(1-t)\cdot p(x+1, y)+t\cdot p(x+1, y+1)$$

$$q(x',y')=(1-s)\cdot Q1'+s\cdot Q2'$$

Figure 7:
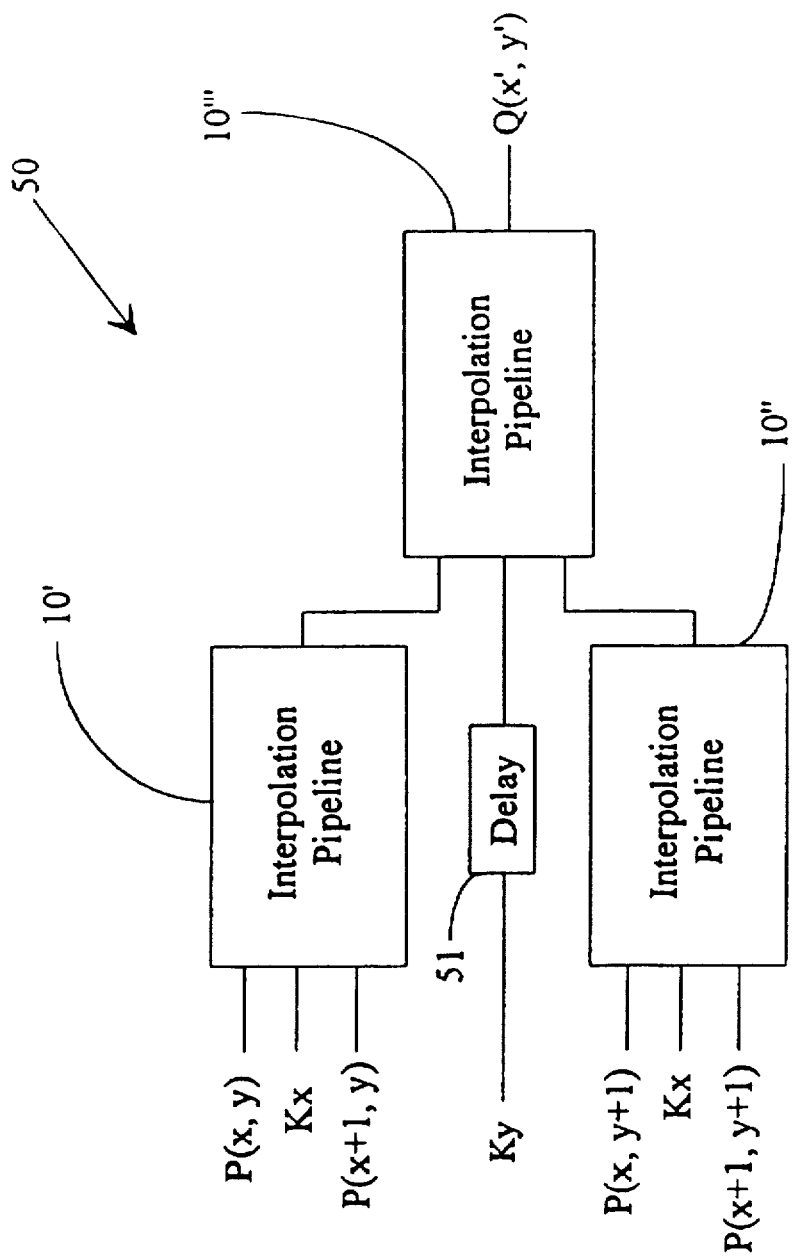
FIG. 7 is a schematic diagram of a bi-linear interpolation circuit according to the first embodiment.

FIG. 7 shows a schematic diagram of a bi-linear interpolation circuit 50 according to the first embodiment. Each of the interpolation pipelines 10', 10" or 10'" is identical to the interpolation pipeline 10 shown in FIG. 3 or 4. Interpolation pipelines 10' and 10" utilized the quantized interpolation parameter $K_x$; whereas, interpolation pipeline 10'" utilized the quantized interpolation parameter $K_y$. A delay 51 is also shown in FIG. 7, to indicate the delayed execution of the interpolation pipeline 10'" relative to interpolation pipelines 10' and 10", which are in parallel.

Figure 8:
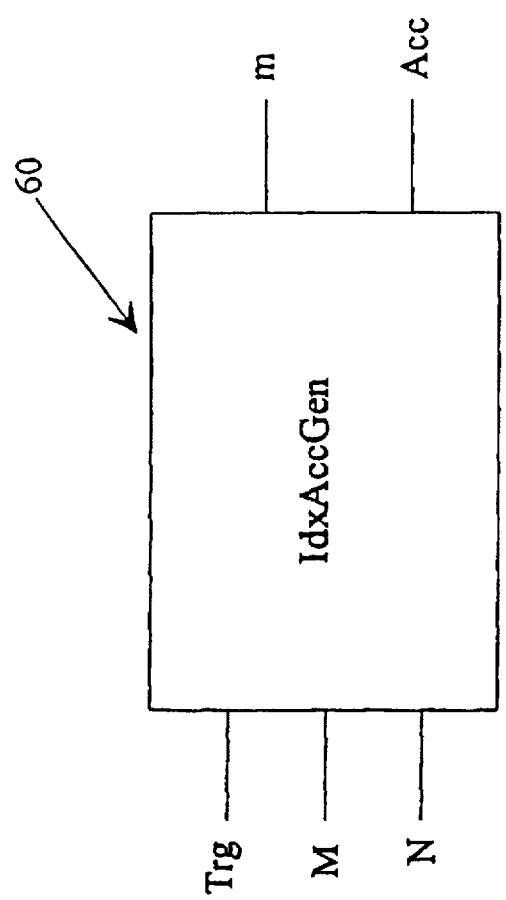
FIG. 8 is a schematic block diagram of an IdxAccGen looped circuit for generating interpolation parameters m and Acc.

FIG. 8 shows a schematic block diagram of an IdxAccGen looped circuit 80 for generating parameters m and Acc, from Trg, M, and N, wherein Trg is the target pixel count, and M and N are the number of pixels (one-dimensional) of the old and new images, respectively.

To illustrate how the IdxAccGen looped circuit 80 operates, its steps are carried out as shown in Table 1, below, using M=4, N=10, M%N=4, and INT (M/N)=0:

TABLE

| Step Value of (Trg or n) | Execution | Temporary Values Acc | Temporary Values m | Output Values Acc | Output Values m |
|---|---|---|---|---|---|
| 0 | initialization | 0 | 0 | 0 | 0 |
| 1 | Acc = Acc + M%N | 4 | | | |
| | m = m + INT (M/N) | | 0 | 4 | 0 |
| 2 | Acc = Acc + M%N | 8 | | | |
| | m = m + INT (M/N) | | 0 | 8 | 0 |
| 3 | Acc = Acc + M%N | 12 | | | |
| | m = m + INT (M/N) | | 0 | | |
| | but ∵ Acc ≧ N | | | | |
| | ∴ Acc = Acc − N, | 2 | | | |
| | m = m + 1 | | 1 | 2 | 1 |
| 4 | Acc = Acc + M%N | 6 | | | |
| | m = m + INT (M/N) | | 1 | 6 | 1 |
| 5 | Acc = Acc + M%N | 10 | | | |
| | m = m + INT (M/N) | | 1 | | |
| | ∵ Acc ≧ N | | | | |
| | ∴ Acc = Acc − N, | 0 | | | |
| | m = m + 1 | | 2 | 0 | 2 |
| 6 | Acc = Acc + M%N | 4 | | | |
| | m = m + INT (M/N) | | 2 | 4 | 2 |
| 7 | Acc = Acc + M%N | 8 | | | |
| | m = m + INT (M/N) | | 2 | 8 | 2 |
| 8 | Acc = Acc + M%N | 12 | | | |
| | m = m + INT (M/N) | | 2 | | |
| | ∵ Acc ≧ N | | | | |
| | ∴ Acc = Acc − N, | 2 | | | |
| | m = m + 1 | | 3 | 2 | 3 |
| 9 | Acc = Acc + M%N | 6 | | | |
| | m = m + INT (M/N) | | 3 | 6 | 3 |

Figure 9:
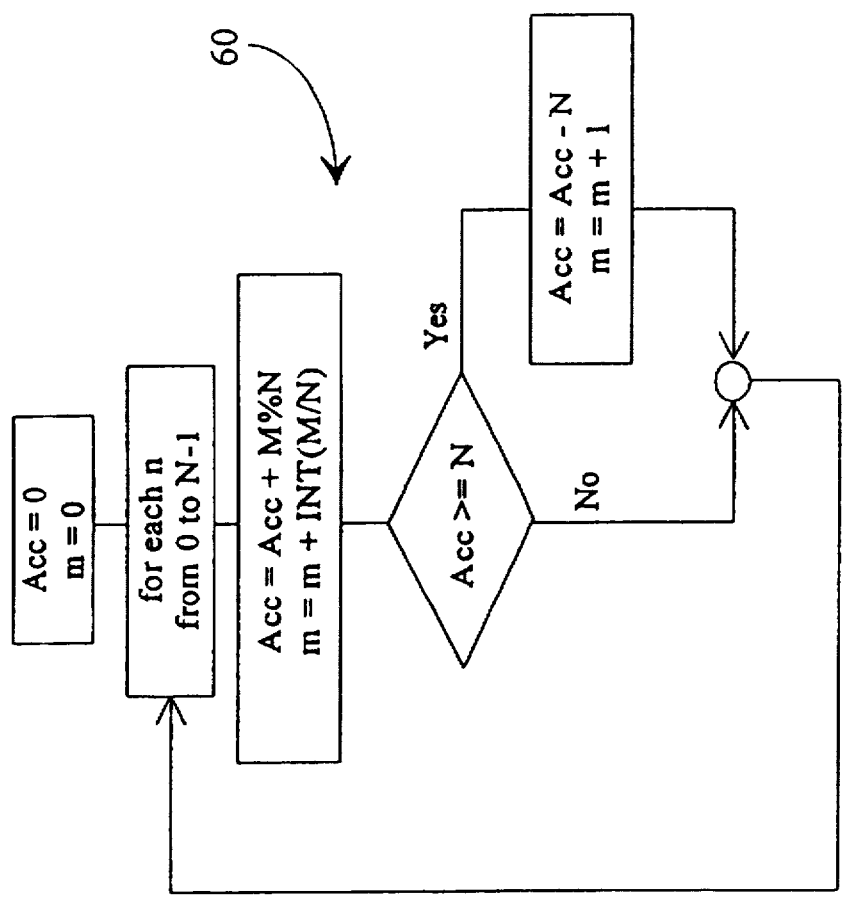
FIG. 9 is a flowchart diagram of a preferred embodiment by which the IdxAccGen looped circuit 60 operates.
Figure 10:
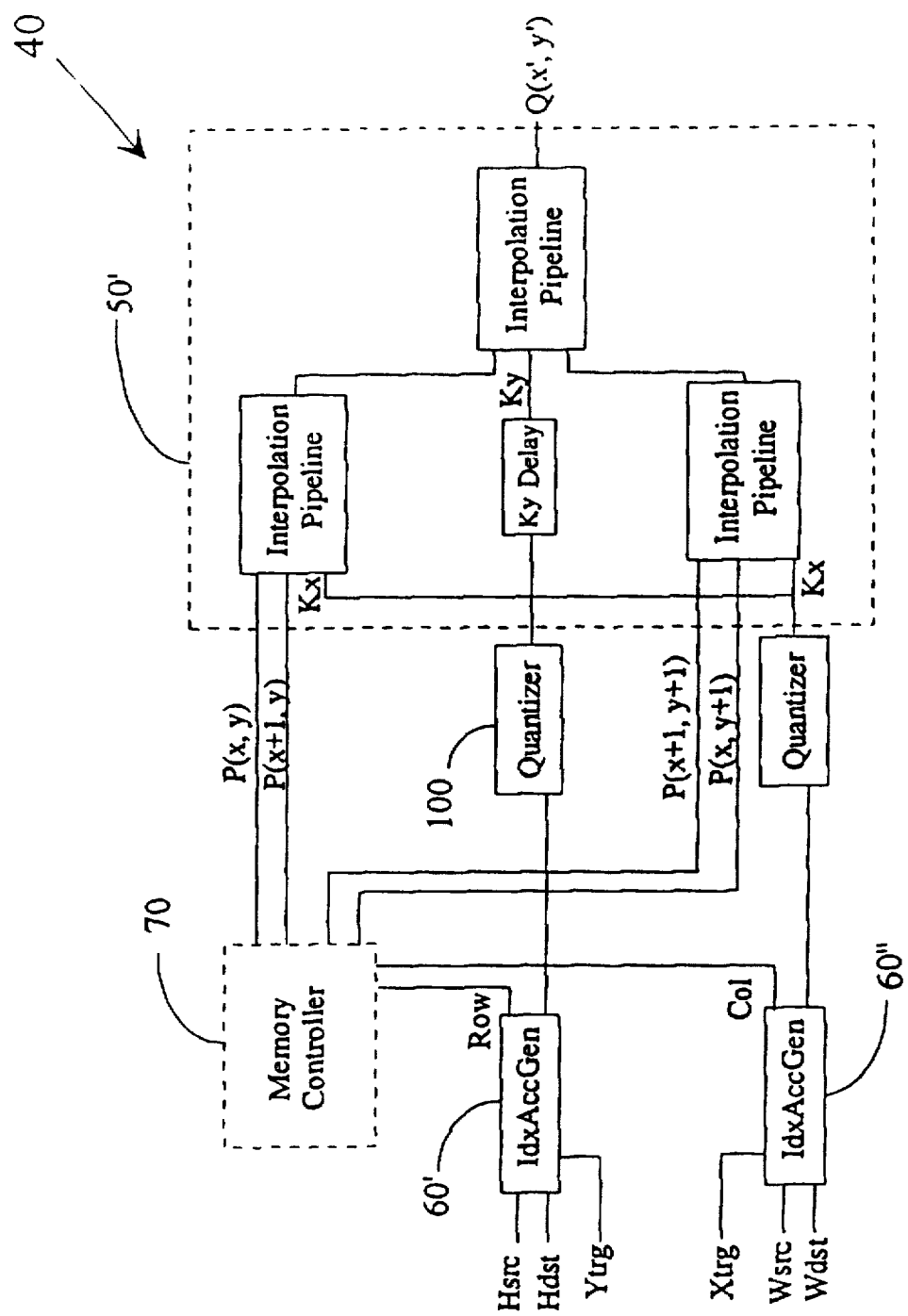
FIG. 10 is a schematic block diagram of a fast bi-linear interpolation circuit according to a preferred embodiment of the present invention in which two of the IdxAccGen looped circuits as shown in FIG. 8 have been incorporated into the bi-linear interpolation circuit as shown in FIG. 7.

FIG. 9 is a flowchart diagram by which the IdxAccGen looped circuit 60 operates, according to a preferred embodiment of the present invention. Two of such IdxAccGen looped circuits, 60' and 60", are incorporated into the bi-linear interpolation circuit 50', so as to form a fast bi-linear interpolation circuit 40, as shown in FIG. 10. A memory controller 70 receives output data of m so as to retrieve values for P's.

Figure 11:
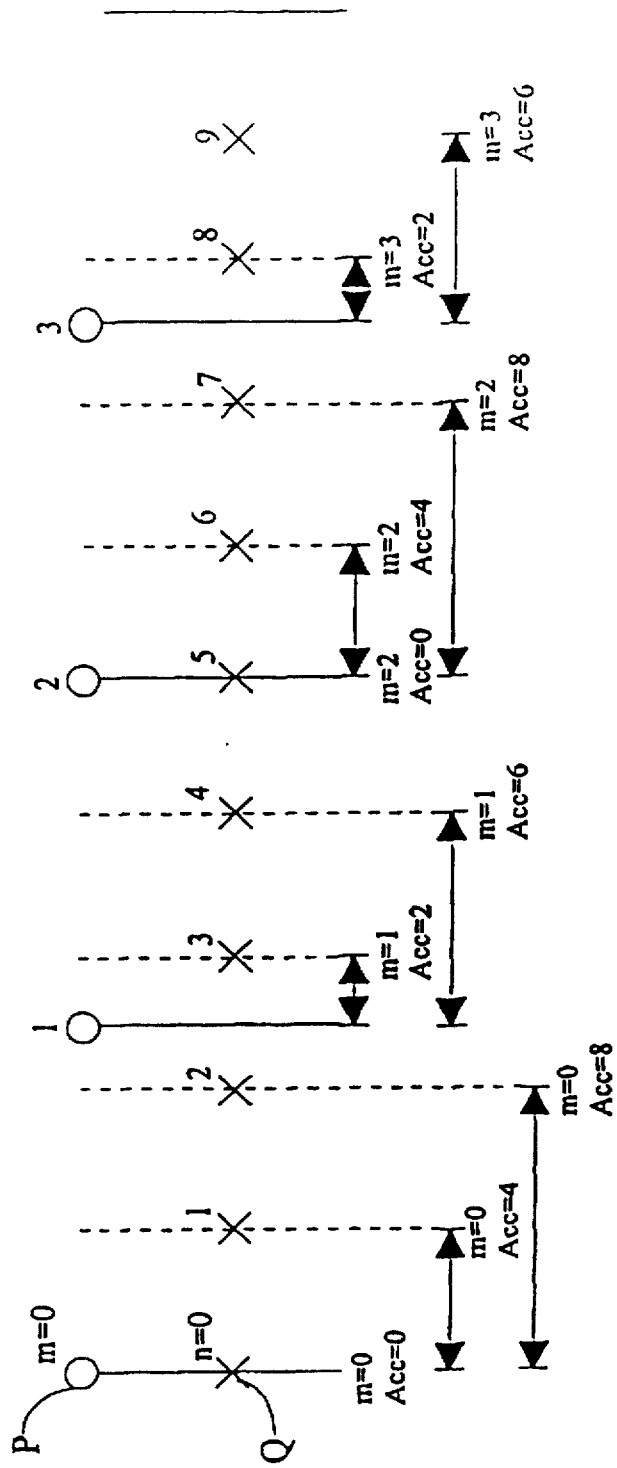
FIG. 11 further illustrates the step-by-step operation of the IdxAccGen looped circuit using M=4 and N=10.

FIG. 11 further illustrates the procedure described in Table 1. The various steps described in FIG. 11 are discussed more fully as follows:

Step 0: Generating data for Q(0)
In step 0, the system is initialized and the first pixel is generated, output m=0 indicates that Q(0) falls between P(0) and P(1). Because Acc=0, indicating Q(0)=P(0) (i.e., Q(0)= (1−0/10)P(0)+(0/10)P(1)=P(0), please see Formula (1)).

Step 1: Generating data for Q(1)
Since Acc=Acc+M%N=0+4=4, thus the output of Acc=4. This indicates that the distance ratio (between Q(1) and the two immediately adjacent points) is 4/10: 6/10. Further, m=m+INT (M/N)=0+0=0, indicating Q(1) still falls between P(0) and P(1).

Step 2: Generating data for Q(2)
Since Acc=Acc+M%N=4+4=4, thus the output of Acc=8. This indicates that the distance ratio is 8/10:2/10. Further, m=m+INT (M/N)=0+0 =0, indicating Q(2) still falls between P(0) and P(1).

Step 3: Generating data for Q(3)
Acc=Acc+M%N=8+4=12, and m=m+INT (MIN)=0+0= 0. Since Acc≧N (=10), thus the output of Acc=Acc−N=12− 10=2 and m=m+1=1. The distance ratio is 2/10:8/10. Further since m=1, indicating Q(3) falls between P(1) and P(2).

Step 4: Generating data for Q(4)
Since Acc=Acc+M%N=2+4=6, thus the output of Acc=6. The distance ratio is 6/10:4/10. m=m+INT (MIN)=1+0=1, indicating Q(4) still falls between P(1) and P(2).

Step 5: Generating data for Q(5)
Acc=Acc+M%N=6+4=10, and m=m+INT (M/N)=1+0=1. Since Acc≧N (=10), thus the output of Acc=Acc−N=10− 10=0 and m=m+1=2. The distance ratio is 0/10:10/10 (i.e., it coincides with the left reference point). Further since m=2, indicating Q(5) falls between P(2) and P(3).

Step 6: Generating data for Q(6)
Since Acc=Acc+M%N=0+4=4, thus the output of Acc=4. The distance ratio is 4/10:6/10. m=m+INT (MIN)=2+0=2, indicating Q(6) still falls between P(2) and P(3).

Step 7: Generating data for Q(7)
Since Acc=Acc+M%N=4+4=8, thus the output of Acc=8. The distance ratio is 8/10:2/10. m=m+INT (M/N)=2+0=2, indicating Q(7) still falls between P(2) and P(3).

Step 8: Generating data for Q(8)
Acc=Acc+M%N=8+4=12, and m=m+INT (MIN)=2+0= 2. Since Acc≧N (=10), thus the output of Acc=Acc−N=12− 10=2 and m=m+1=3. The distance ratio is 2/10:8/10. Further since m=3, indicating Q(8) falls between P(3) and P(4).

Step 9: Generating data for Q(9)
Since Acc=Acc+M%N=2+4=6, thus the output of Acc=6. The distance ratio is 6/10:4/10. m=m+INT (MIN)=3+0=3, indicating Q(9) still falls between P(3) and P(4).

After Step 9, the data for all the new points Q's have been generated. In steps 8–9, m=3, indicating that Q value falls between P(3) and P(4). Because P(4) in fact does not exist in FIG. 11 (when M=4, the calculations are based on P(0) and P(3)), in actual implementations, P(4) is caused to be equal to P(3). The m value generated by IdxAccGen is sent to the memory controller to obtain its pixel value, and the calculated Acc is sent to the quantizer for further processing.

Figure 12:
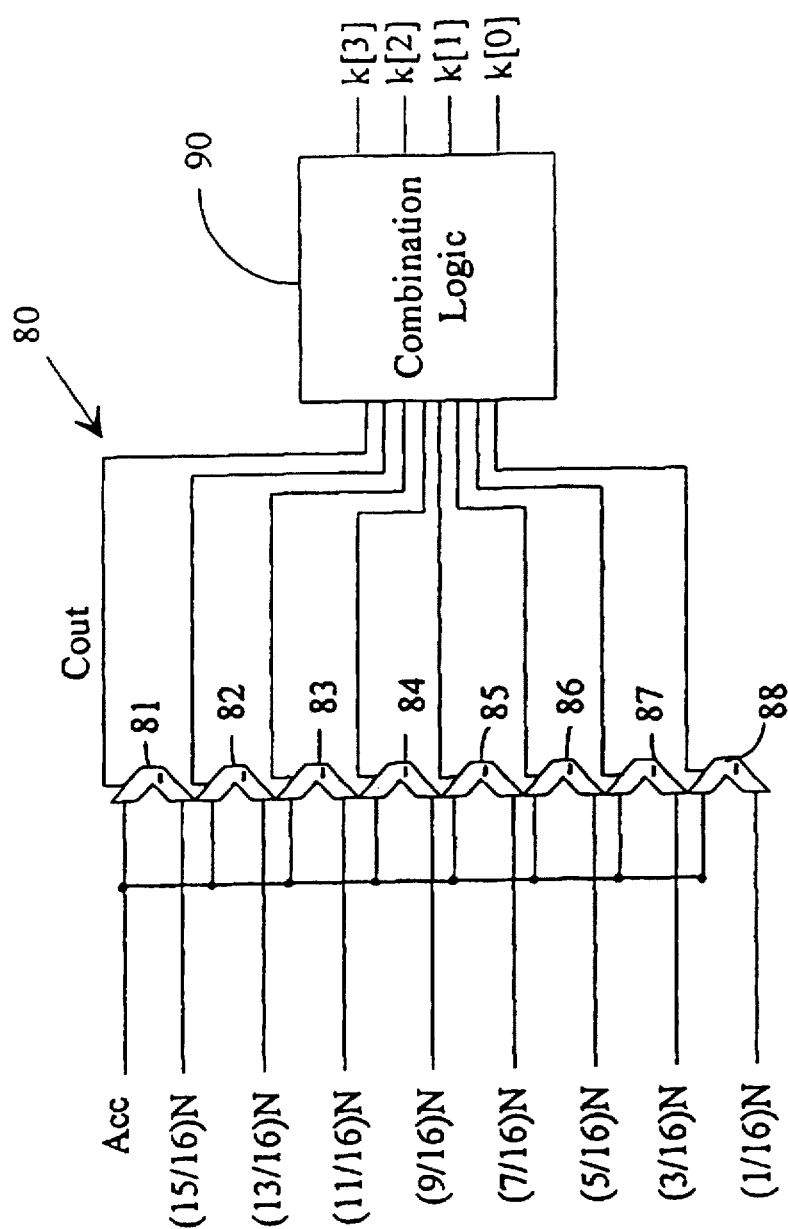
FIG. 12 is a schematic drawing showing a quantizer circuit 80 to obtain the quantized parameter K ($K_x$ or $K_y$).

In the present invention, the interpolation parameter Acc is quantized via a quantizer circuit 80 shown in FIG. 12 to obtain quantized parameter K ($K_x$ or $K_y$). For i=3, the process of quantization divides the normalized distance between two pixels to be interpolated into 9 regions (each region is represented by a quantized value from 0/8 to 8/8). The value of Acc is compared against (1/16)N, (3/16)N, ..., and (15/16)N, using a plurality of comparators 81–88, to obtain the closest match. A combination logic 90, which basically comprises an encoder, transforms the output (Cout) from these comparators into k[3:0]. Similar to those shown in FIGS. 3 and 4, the values of $(1/16)N$, $(3/16)N$, ..., and $(15/16)N$ are obtained by combinations of adders, subtractor, and a plurality of hard-wired fixed-value multipliers and dividers. This implementation allows the interpolation circuit of the present invention to avoid the relatively slow multipliers, and a very fast speed can thus be obtained on a real time basis. The comparators 81–88 are basically subtractors which output 1 and 0 signals. Using, as an example, the case with Acc=9 and N=23. The value of Acc/N (9/23) falls in the region between (7/16) and (5/16), and an input of [0, 0, 0, 0, 0, 1, 1, 1] will be received by the combination logic 90, which encodes it to be [0 0 1 1] (k=3). The difference between 9/23 (the theoretical interpolation parameter) and 3/8 (the actual interpolation parameter used in the present invention) was not visible to the human eyes. However, the present invention allows a far superior scaling speed to be achieved.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An apparatus for bi-linearly scaling an old M×M' (M columns by M' rows) video screen image into a new N×N' video screen image by which the pixel value of a new pixel q(x', y') is interpolated from the pixel values of four immediately enclosing old pixels, p(x, y), p(x+1, y), p(x, y+1), and p(x+1, y+1), wherein x is a first coordinate, y is a second coordinate, said apparatus comprising:
    (a) a counter for obtaining the x-directional and y-directional pixel counts of said new pixel (x', y'), designated as n and n', respectively;
    (b) an accumulator for calculating the x-directional and y-directional pixel counts of said old pixel (x, y), designated as m and m', respectively;
    (c) first and second index generators associated with said accumulator for calculating x-directional and y-directional interpolation parameters Acc and Acc', respectively, wherein Acc is the numerator of the fraction after the division of (n·M+N), and Acc' is the numerator of the fraction after the division (n'·M'+N');
    (d) first quantizer for quantizing Acc/N into $K_x/2^i$, wherein i is an integer greater than 1;
    (e) second quantizer for quantizing Acc'/N' into $K_y/2^i$;
    (f) first, second, and third interpolation pipelines, wherein said first and second interpolation pipelines are connected in parallel for obtaining first and second interpolated values from p(x, y) and p(x+1, y), and from p(x, y+1) and p(x+1, y+1), respectively, based on the value of $K_x$, and said third interpolation pipeline is provided to obtain q(x', y') from the first and second interpolated values, based on the value of $K_y$; and
    (g) a delay circuitry for delaying the execution of said third interpolation pipeline until the executions of said first and second interpolation pipelines are completed.

2. An apparatus for bi-linearly scaling video screen image according to claim 1 wherein each of said interpolation pipelines comprises:
    (a) input means for receiving first and second values, designated as P1 and P2, respectively, from which interpolation is to be made;
    (b) a first circuit for calculating the values of 1×P1, 2×P1, 3×P1, ..., and $2^i$×P1, respectively;
    (c) a second circuit for calculating the values of 1×P2, 2×P2, 3×P2, ..., and $2^i$×P2, respectively;
    (d) a first multiplexer for orderly selecting one output from $2^i$ inputs of {0, 1×P2, 2×P2, 3×P1, ..., $(2^i-1)$×P2)} according to the value of K, which is either $K_x$ or $K_y$;
    (e) a second multiplexer for reverse-orderly selecting one output from $2^i$ inputs of {1×P1, 2×P1, 3×P1, ..., $2^i$×[P1 or P2]} according to the value of K;
    (f) a third multiplexer for selecting either P1 or P2 is to be chosen as an input to be sent to the second multiplexer, said third multiplexer is adopted to receive the most significant bit of K, such that if the most significant bit of K is one, then the third multiplexer will select P2, otherwise, P1 will be selected;
    (g) an adder for adding outputs from said rust and second multiplexers; and
    a divider for dividing the output from said adder means in step (g) by $2^i$.

3. An apparatus for bi-linearly scaling video screen images according to claim 2 wherein each of said first circuit means and said second circuit means comprises a set of x1, x2, ..., $x2^{i-1}$, and $x2^i$ multipliers, at least one adder, and at least one subtractor.

4. An apparatus for bi-linearly scaling video screen images according to claim 3 wherein each of said multipliers is a hard-wired fixed-value multiplier.

5. An apparatus for bi-linearly scaling video screen images according to claim 1 wherein each of said first and second guantizer comprises a plurality hard-wired fixed-value multipliers for multiplying the input value by factors of $(2^a+1)$, respectively wherein a is an integer from 1 to 2i.

6. An apparatus for bi-linearly scaling according to claim 1 wherein each of said first and second quantizers further comprises a plurality comparators and a combination logic.

7. A fast bi-linear interpolation method for use in scaling an old M×M' (M columns by M' rows) video screen image into a new N×N' video screen image by which the pixel value of a new pixel q(x', y') is interpolated from the pixel values of four immediately enclosing old pixels, p(x, y), p(x+1, y), p(x, y+1), and p(x+1, y+1), wherein x is a first coordinate, y is a second coordinate, said method comprising the steps of:
    (a) using a counter to obtain the x-directional and y-directional pixel counts of said new pixel (x', y'), designated as n and n', respectively:
    (b) using an accumulator to calculate the x-directional and y-directional pixel counts of said old pixel (x, y), designated as m and m', respectively;
    (c) using first and second index generators associated with said accumulator means to calculate x-directional and y-directional interpolation parameters Acc and Acc', respectively, wherein Acc is the numerator of the fraction after the division of (n·M+N), and Acc' is the numerator of the fraction after the division (n'·M'+N');
    (d) using a first quantizer to quantize Acc/N into $K_x/2^i$, wherein i is an integer greater than 1;
    (e) using a second quantizer to quantize Acc'/N' into $K_y/2^i$;
    (f) using first and second interpolation pipelines, which are connected in parallel, to obtain first and second interpolated values from p(x, y) and p(x+1, y), and from p(x, y+1) and p(x+1, y+1), respectively, based on the value of $K_x$;

(g) and using a third interpolation pipeline to obtain q(x', y') from the first and second interpolated values, based on the value of $K_y$; wherein the execution of said third interpolation pipeline is delayed until the executions of said first and second interpolation pipelines are completed.

8. A real-time bi-linear interpolation method for scaling video screen images according to claim 7 wherein each of said interpolation pipelines comprises:

(a) input means for receiving first and second values, designated as P1 and P2, respectively, from which interpolation is to be made;

(b) a first circuit for the values of 1×P1, 2×P1, 3×P1, ..., and $2^i$×P1, respectively;

(c) a second circuit for calculating the values of 1×P2, 2×P2, 3×P2,... ,and $2^i$×P2, respectively;

(d) a first multiplexer for orderly selecting one output from $2^i$ inputs of {0, 1×P2, 2×P2, 3×P1, ..., $(2^i-1)$×P2} according to the value of K, which is either $K_x$, or $K_y$;

(e) a second multiplexer for reverse-orderly selecting one output from $2^i$ inputs of {1×P1, 2×P1, 3×P1, ..., $2^i$×[P1 or P2]} according to the value of K;

(f) a third multiplexer for selecting either P1 or P2 is to be chosen as an input to be sent to the second multiplexer, said third multiplexer is adopted to receive the most significant bit of K, such that if the most significant bit of K is one, then the third multiplexer will select P2, otherwise, P1 will be selected;

(g) an adder for adding outputs from said first and second multiplexers; and (h) a divider for dividing the output from said adder in step (g) by $2^i$.

9. A real-time bi-linear interpolation method for scaling video screen images according to claim 8 wherein each of said first circuit means and said second circuit means comprises a set of x1, x2, ..., $x2^{i-1}$, and $x2^i$ multipliers, at least one adder, and at least one subtractor.

10. A real-time bi-linear interpolation method for scaling video screen images according to claim 9 wherein each of said multipliers is a hard-wired fixed-value multiplier.

11. A real-time bi-linear interpolation method for scaling video screen images according to claim 7 wherein each of said first and second quantizer means comprises a plurality hard-wired fixed-value multipliers for multiplying the input value by factors of $(2^a+1)$, respectively, wherein a is an integer from 1 to 2i.

12. A real-time bi-linear interpolation method for scaling video screen images according to claim 7 wherein each of said first and second quantizer means further comprises a plurality comparators and a combination logic.

* * * * *